H. M. BODINE.
WALK CLEANER.
APPLICATION FILED JAN. 7, 1913.
1,106,620.
Patented Aug. 11, 1914.
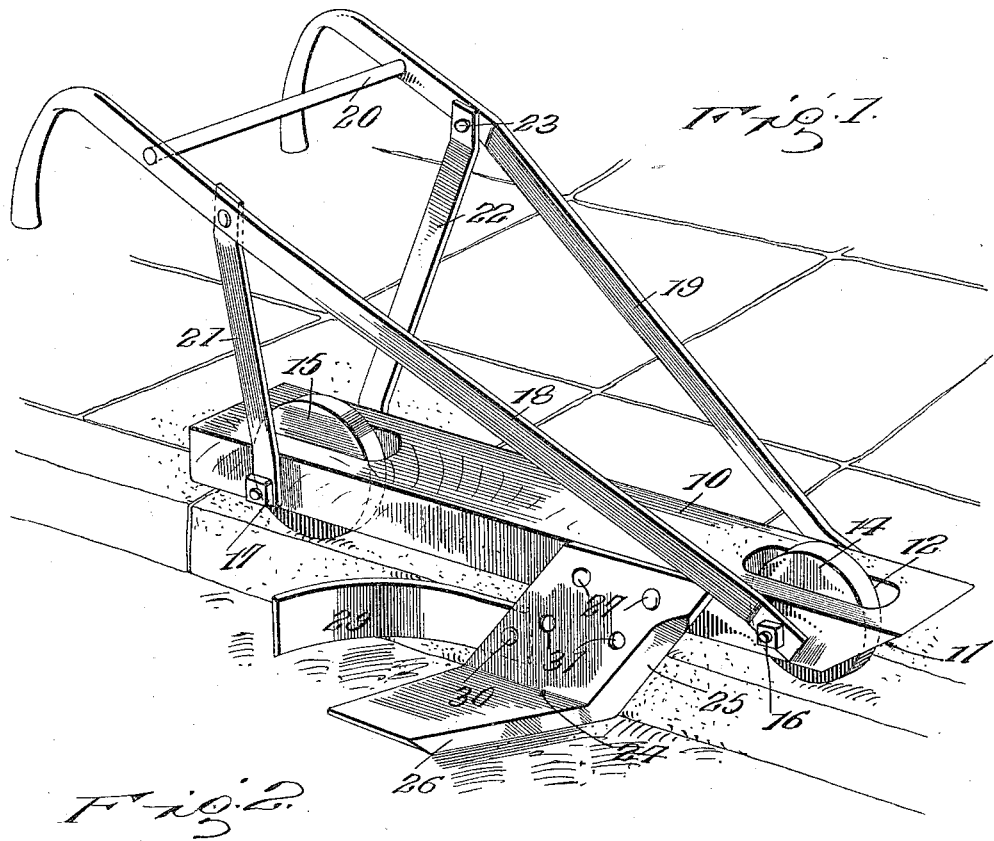
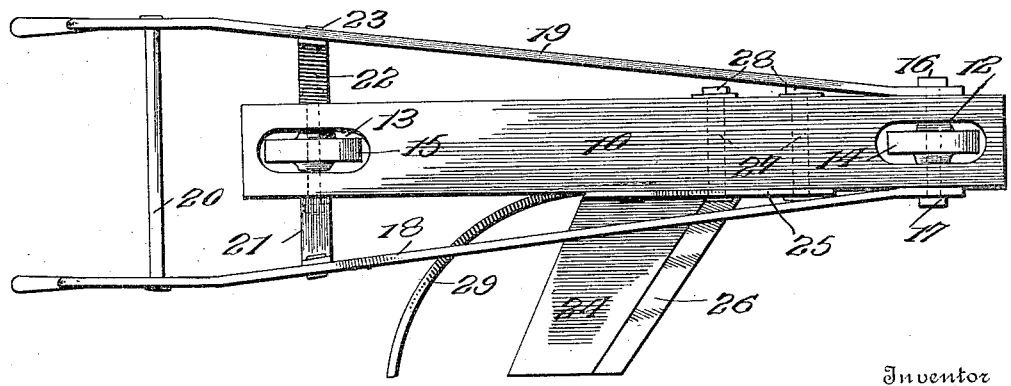

UNITED STATES PATENT OFFICE.

HENRY M. BODINE, OF WICHITA, KANSAS.

WALK-CLEANER.

1,106,620.   Specification of Letters Patent.   Patented Aug. 11, 1914.

Application filed January 7, 1913. Serial No. 740,697.

*To all whom it may concern:*

Be it known that I, HENRY M. BODINE, citizen of the United States, residing at Wichita, in the county of Sedgwick and State of Kansas, have invented certain new and useful Improvements in Walk-Cleaners, of which the following is a specification.

My invention relates to new and useful improvements in walk cleaners and more particularly to walk cleaners adapted to cut-away and remove turf and earth along the edges of walks passing through lawns, parks and the like, to provide ditches or gutters by the walks into which rain water will flow from the walk and into which water from melted snow along the walk will flow.

The object of my invention is to provide a device of the above described character which may be readily operated and which will not only cut-away the turf and earth, but which will also turn the same back to clear the ditch or gutter.

A further object of my invention is to provide a device of the above described character in which the cutting member or share may be adjusted to form ditches of varying depths and in which the moldboard is always suitably adjusted, being carried by the share. And a still further object of my invention is to in general, improve the construction and increase the efficiency of walk cleaners of the above described character.

With these and other objects in view, my invention will be more fully described, illustrated in the accompanying drawing, and then specifically pointed out in the claims which are attached to and form a part of this application.

In the drawing: Figure 1 is a perspective view of my improved walk cleaner in operation; Fig. 2 is a top plan view of the same.

Corresponding and like parts are referred to in the following description and indicated in all the views of the drawing by the same reference characters.

The preferred embodiment of my invention, as best shown in Fig. 1 of the drawing, includes a body member or beam mounted upon ground wheels, having handles by means of which it may be guided and carrying a cutting member or share to which is fastened a mold-board. More specifically the body member 10, which is preferably formed of wood, is substantially rectangular in shape with its forward end beveled as shown at 11. This body member is provided adjacent its forward and rear ends with longitudinally alined slots 12 and 13 to receive the ground wheels 14 and 15 which are rotatably mounted upon bolts 16 extending through the body or beam of the device and through the wheels, these bolts being secured against displacement by nuts 17. The bolt 16 upon which the forward wheel is mounted is also passed through the lower ends of upwardly and rearwardly extending handles 18 and 19 which are bent to diverge from each other as shown and which are maintained in proper spaced relation by a brace or spacer bar 20. The bolt 16 upon which the rear wheel is journaled is also passed through the lower ends of vertical braces 21 and 22, the upper ends of which are secured to the intermediate portions of the handles 18 and 19 by rivets or other suitable fastening devices 23.

The cutting member or share of my improved device, designated as a whole by the numeral 24, comprises a substantially rectangular shaped piece of metal, the ends of which are bent at right angles to each other to provide a vertical cutting blade 25 and a horizontal cutting blade 26, which in effect forms, a continuation of the cutting blade 25. This cutting member is secured by the upper portion of its vertical blade to the intermediate portion of the body or beam 10 by bolts 27 passed transversely through the beam and secured in place by nuts 28. As clearly shown in the drawing, this cutting member is so formed and so secured to the beam that the cutting blade 25 not only extends downwardly, but also extends rearwardly in order to insure a shearing effect during its passage through the turf and thus permit the cutting of the turf with less application of force. The blade portion 26 not only extends outwardly, but also extends rearwardly to produce the same shearing effect on the horizontal cut. As clearly shown in Fig. 1 of the drawing, the device is moved along the edge of the walk, the ground wheels resting upon the curb or walk edge and the vertical cutting blade 25 operating in slightly spaced relation from the walk edge, while the horizontal cutting blade 26 operates beneath the turf to free the same from the soil.

Secured to the lower edge portion of the cutting member or share 24 and extending rearwardly therefrom, is a mold-board 29, the rear end of which is curved outwardly as shown, this mold-board acting, in a manner which will be readily understood, to turn back the earth and turf loosened and cut-away by the cutting member or share and so effectually clear the ditch or gutter formed by the device. This mold-board may be formed integrally with the cutting member, if desired, but is preferably formed in a separate piece and secured to the cutting member by a rivet or other suitable fastening device 30.

As shown in Fig. 1 of the drawing, the vertical cutting blade 25 is preferably provided with bolt receiving openings 31 spaced below the openings through which the bolts 27 normally pass, these openings permitting the removal of the bolts 27 and their application through these openings and through the beam to secure the cutting member and mold-board in raised position with respect to the beam. By this means, the depth of the ditch or gutter formed may be regulated. For instance, when the device is used upon a concrete or flag walk of the character shown in Fig. 1, it will naturally be somewhat above the ground and the share and mold-board will be employed in their lowermost position. If however, the device is to be employed in forming ditches or gutters at the edges of dirt or cinder walks, the share and mold-board will preferably be raised as the walk will be substantially on the same level with the ground, the ditch or gutter formed therefore being substantially the same depth as the one formed with a concrete walk and the lowered share and mold-board.

From the foregoing description, it will be apparent that I have provided an extremely simple and economical form of walk cleaner, the securing of the handles and braces to the share by the bolts upon which the ground wheels are journaled greatly simplifying the construction of the device without in any way affecting its efficiency.

It will of course be understood that I do not wish to limit myself to the specific details of construction set forth in the drawing as minor changes may, at any time, be made, if desired, without in the slightest degree departing from the spirit of my invention.

Having thus described the invention, what is claimed as new is:

1. A walk cleaner including a wheeled beam, a cutting member secured thereto, said cutting member including a vertically disposed blade and a horizontally disposed blade, and a moldboard having its one terminal secured to the vertical blade, said moldboard being curved outwardly and rearwardly with its concave face remote from the beam and extending for the major portion of its length in the rear of the horizontal blade and directed completely across the path of movement thereof.

2. A walk cleaner including a wheeled beam, a cutting member attached to the beam intermediate the length thereof, said cutting member including a vertical cutting blade and a horizontal cutting blade, and a vertically arranged moldboard secured to the vertical cutting blade, said moldboard being curved outwardly and rearwardly, whereby it extends horizontally across the path of movement of the horizontal cutting blade and in the rear thereof, the moldboard being disposed with its concave face adjacent the cutting member.

In testimony whereof I affix my signature in presence of two witnesses.

HENRY M. BODINE. [L. S.]

Witnesses:
 RODOLPH HATFIELD,
 O. C. HERRON.

---

Copies of this patent may be obtained for five cents each, by addressing the "Commissioner of Patents, Washington, D. C."